US012580191B2

(12) United States Patent
Ishiguro et al.

(10) Patent No.: US 12,580,191 B2
(45) Date of Patent: Mar. 17, 2026

(54) NON-AQUEOUS ELECTROLYTE SECONDARY BATTERY

(71) Applicant: Panasonic Intellectual Property Management Co., Ltd., Osaka (JP)

(72) Inventors: Tasuku Ishiguro, Osaka Fu (JP); Yuanlong Zhong, Osaka Fu (JP); Chisaki Fujitomo, Miyazaki Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 511 days.

(21) Appl. No.: 18/034,175

(22) PCT Filed: Oct. 27, 2021

(86) PCT No.: PCT/JP2021/039608
§ 371 (c)(1),
(2) Date: Apr. 27, 2023

(87) PCT Pub. No.: WO2022/092136
PCT Pub. Date: May 5, 2022

(65) Prior Publication Data

US 2023/0395794 A1 Dec. 7, 2023

(30) Foreign Application Priority Data

Oct. 30, 2020 (JP) ................................ 2020-182029

(51) Int. Cl.
*H01M 4/525* (2010.01)
*H01M 4/505* (2010.01)
(Continued)

(52) U.S. Cl.
CPC ........... *H01M 4/525* (2013.01); *H01M 4/505* (2013.01); *H01M 10/0567* (2013.01); *H01M 10/0569* (2013.01)

(58) Field of Classification Search
CPC .. H01M 4/525; H01M 4/505; H01M 10/0567; H01M 10/0569
See application file for complete search history.

(56) References Cited

U.S. PATENT DOCUMENTS

2009/0035659 A1 2/2009 Takeuchi et al.
2012/0308881 A1 12/2012 Tokuda et al.
(Continued)

FOREIGN PATENT DOCUMENTS

CN 108807980 A 11/2018
CN 109390576 A 2/2019
(Continued)

OTHER PUBLICATIONS

Extended (Supplementary) European Search Report dated Jan. 8, 2025, issued in counterpart EP Application No. 21886254.8. (9 pages).

(Continued)

*Primary Examiner* — Sarah A. Slifka
(74) *Attorney, Agent, or Firm* — WHDA, LLP

(57) ABSTRACT

A non-aqueous liquid electrolyte secondary battery including a positive electrode, a negative electrode, and a non-aqueous electrolyte, in which the positive electrode includes a positive electrode active material, and a carbon nanotube, the positive electrode active material includes a lithium-transition metal composite oxide containing Ni, a proportion of Ni in metal elements other than Li in the lithium-transition metal composite oxide is 80 atm % or more, and the non-aqueous electrolyte includes a fluorosulfonic acid salt.

7 Claims, 1 Drawing Sheet

(51) Int. Cl.

| | |
|---|---|
| ***H01M 10/0567*** | (2010.01) |
| ***H01M 10/0569*** | (2010.01) |

(56) References Cited

U.S. PATENT DOCUMENTS

| | | | |
|---|---|---|---|
| 2017/0092979 | A1 | 3/2017 | Chiga et al. |
| 2018/0351200 | A1 | 12/2018 | Zhamu et al. |
| 2019/0081355 | A1 | 3/2019 | Nakayama |
| 2020/0335823 | A1 | 10/2020 | Takahashi et al. |
| 2022/0013780 | A1 | 1/2022 | Nishitani et al. |

FOREIGN PATENT DOCUMENTS

| | | | |
|---|---|---|---|
| JP | 2006-310181 | A | 11/2006 |
| JP | 2011-187440 | A | 9/2011 |
| JP | 2014-238944 | A | 12/2014 |
| JP | 2017-69184 | A | 4/2017 |
| JP | 2019-50153 | A | 3/2019 |
| JP | 2020-524359 | A | 8/2020 |
| WO | 2019/117101 | A1 | 6/2019 |
| WO | 2020/110917 | A1 | 6/2020 |

OTHER PUBLICATIONS

International Search Report dated Dec. 7, 2021, issued in counterpart International Application No. PCT/JP2021/039608 (2 pages).

Office Action dated Jul. 29, 2025, issued in counterpart JP Application No. 2022-559188. (3 pages).

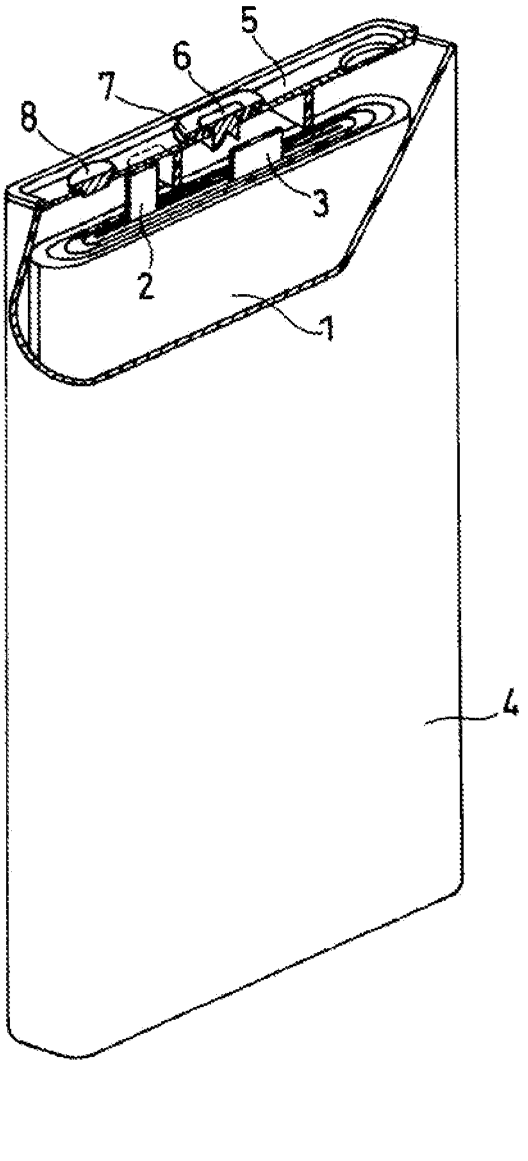
5
6
7
8
3
2
1
4

NON-AQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2021/039608 filed on Oct. 27, 2021 which claims the benefit of priority under 35 U.S.C. § 119(a) of Japanese Patent Application No. 2020-182029 filed on Oct. 30, 2020 in Japan, the contents of which are incorporated herein by reference.

TECHNICAL FIELD

The present disclosure relates to a non-aqueous electrolyte secondary battery.

BACKGROUND ART

Non-aqueous electrolyte secondary batteries have high output and high energy density and are therefore expected as a promising power source for small consumer applications, power storage devices, and electric cars. As a positive electrode active material in non-aqueous electrolyte secondary batteries, a composite oxide of lithium and a transition metal (e.g., cobalt) is used. A higher capacity can be achieved by replacing part of the cobalt with nickel.

Patent Literature 1 proposes a positive electrode active material for a non-aqueous liquid electrolyte secondary battery, comprising a lithium-containing composite oxide represented by $Li_xNi_{1-y-z-v-w}Co_yAl_zM1_vM2_wO_2$. The element M1 is at least one selected from the group consisting of Mn, Ti, Y, Nb, Mo, and W. The element M2 is at least two selected from the group consisting of Mg, Ca, Sr, and Ba, and the element M2 includes at least Mg and Ca, $0.97 \leq x \leq 1.1$, $0.05 \leq y \leq 0.35$, $0.005 \leq z \leq 0.1$, $0.0001 \leq v \leq 0.05$, and $0.0001 \leq w \leq 0.05$. The composite oxide is secondary particles formed of an aggregate of primary particles. The average particle diameter of the primary particles of the composite oxide is 0.1 μm or more and 3 μm or less, and the average particle diameter of the secondary particles of the composite oxide is 8 μm or more and 20 μm or less.

Patent Literature 2 proposes a non-aqueous liquid electrolyte containing a non-aqueous solvent, $LiPF_6$, and a fluorosulfonic acid salt represented by a formula (1): $M(FSO_3)_x$. In the formula (1), M is a metal atom, or $N(R)_4$ or $P(R)_4$, where R is an organic group having 1 to 12 carbon atoms or a hydrogen atom (however, all four Rs may not be a hydrogen atom), a plurality of Rs may be the same as or different from each other, and part or all of the four Rs may form a ring together with a nitrogen or phosphorus atom attached thereto. When M is a metal atom, x represents a valence of the metal atom M and is an integer of 1 or more, and when M is $N(R)_4$ or $P(R)_4$, x is 1. The ratio of a molar content of $FSO_3$ to a molar content of $PF_6$ in the non-aqueous liquid electrolyte is 0.001 to 1.2.

Patent Literature 3 proposes a positive electrode for a lithium ion secondary battery in which a positive electrode mixture layer having a positive electrode active material, a conductive agent, and a binder is provided on a positive electrode current collector. The conductive agent includes at least a carbon nanotube, and the binder is an acrylic binder.

CITATION LIST

Patent Literature

Patent literature 1: Japanese Laid-Open Patent Publication No. 2006-310181

Patent Literature 2: Japanese Laid-Open Patent Publication No. 2011-187440

Patent literature 3: Japanese Laid-Open Patent Publication No. 2014-238944

SUMMARY OF INVENTION

Technical Problem

In order to obtain a high capacity when a lithium-transition metal composite oxide containing Ni is used as the positive electrode active material, and the proportion of Ni in the metal elements other than Li is increased, the crystal structure may change at times to a structure into and from which reversible absorption and release of Li ions are difficult. In this case, the impedance after charge-discharge cycles will increase, and the cycle characteristics will deteriorate.

When a fluorosulfonic acid salt is added to the non-aqueous liquid electrolyte, this is expected to improve the cycle characteristics, but due to an increase in the viscosity of the liquid electrolyte, the cycle characteristics at high rates will deteriorate.

By introducing carbon nanotubes into the positive electrode, the cycle characteristics at high rates are expected to be improved, but due to an increase in the reaction resistance at the positive electrode, the impedance will tend to increase.

Solution to Problem

One aspect of the present disclosure relates to a non-aqueous liquid electrolyte secondary battery, including: a positive electrode; a negative electrode; and a non-aqueous electrolyte, wherein the positive electrode includes a positive electrode active material, and a carbon nanotube, the positive electrode active material includes a lithium-transition metal composite oxide containing Ni, a proportion of Ni in metal elements other than Li in the lithium-transition metal composite oxide is 80 atm % or more, and the non-aqueous electrolyte includes a fluorosulfonic acid salt.

Advantageous Effects of Invention

According to the present disclosure, when a lithium-transition metal composite oxide with an increased Ni content is used for the positive electrode of a non-aqueous electrolyte secondary battery, it is possible to improve the cycle characteristics at high rates while suppressing the deterioration of the positive electrode.

While the novel features of the invention are set forth particularly in the appended claims, the invention, both as to organization and content, will be better understood and appreciated, along with other objects and features thereof from the following detailed description taken in conjunction with the drawings.

BRIEF DESCRIPTION OF DRAWING

FIG. 1 A partially cut-away schematic oblique view of a non-aqueous electrolyte secondary battery according to one embodiment of the present disclosure.

DESCRIPTION OF EMBODIMENTS

A non-aqueous electrolyte secondary battery according to the present disclosure includes a positive electrode, a negative electrode, and a non-aqueous electrolyte. The positive electrode includes a positive electrode active material and carbon nanotubes. The positive electrode active material includes a lithium-transition metal composite oxide containing Ni. The proportion of Ni in metal elements other than Li in the lithium-transition metal composite oxide is 80 atm % or more. If the Ni content in the lithium-transition metal composite oxide can be increased as above, this will be advantageous in terms of costs and able to ensure a high capacity. Hereinafter, the lithium-transition metal composite oxide according to the present disclosure is sometimes referred to as a "composite oxide HN".

With the composite oxide HN, the impedance tends to increase due to deterioration. The crystal structure of the composite oxide HN with a high Ni content tends to be unstable, and from the composite oxide HN, metals such as Ni can leach out. The leached Ni may form an oxide surface film having a structure that inhibits the absorption and release of Li ions, on the particle surfaces of the composite oxide HN, which causes the internal resistance to increase. Moreover, when leaching of metals occurs, the capacity itself of the positive electrode active material capacity decreases.

In view of the above, in the present disclosure, the composite oxide HN and carbon nanotubes are contained in the positive electrode, and a non-aqueous electrolyte containing a fluorosulfonic acid salt is used. The anion produced from the fluorosulfonic acid salt is considered to form a robust surface film on the particle surfaces of the composite oxide HN, and has an effect of suppressing the leaching of metals. Therefore, an increase in impedance due to deterioration of the positive electrode when charge and discharge are repeated can be suppressed. On the other hand, the surface film derived from the fluorosulfonic acid salt is excellent in ionic conductivity, and therefore, although being robust, is considered to have little influence on the inhibition of the electrode reaction.

It is to be noted, however, that with the fluorosulfonic acid salt, which causes an increase in the viscosity of the non-aqueous electrolyte in a liquid form (i.e., the liquid electrolyte), and a deterioration in the input-output characteristics in the electrode reaction, the capacity retention rate has a tendency to decrease when charge and discharge are repeated at a high rate (large electric current). To address this, when carbon nanotubes are added to the positive electrode, the distribution of the potential in the positive electrode becomes uniform, and the resistance between the active material particles is reduced, leading to remarkably improved cycle characteristics at high rates. The breadth of improvement in the cycle characteristics at this time greatly exceeds the influence of the deterioration of the input-output characteristics caused by the fluorosulfonic acid salt. In addition, although the carbon nanotubes usually increase the impedance due to the reaction resistance of the positive electrode, the fluorosulfonic acid salt suppresses the increase in the impedance of the positive electrode. As described above, by using in combination a positive electrode containing a composite oxide HN and carbon nanotubes, a non-aqueous electrolyte containing a fluorosulfonic acid salt, the increase in impedance can be suppressed over long time, and the cycle characteristics at high rates can be improved.

In the following, the non-aqueous electrolyte secondary battery according to the present disclosure will be specifically described for each component. The non-aqueous electrolyte secondary battery has, for example, a positive electrode, a negative electrode, a non-aqueous electrolyte, and a separator as described below.

[Positive Electrode]

The positive electrode includes a positive electrode active material. The positive electrode usually includes a positive electrode current collector, and a layer of a positive electrode mixture (hereinafter, a positive electrode mixture layer) held on the positive electrode current collector. The positive electrode mixture layer can be formed by applying a positive electrode slurry prepared by dispersing constituent components of the positive electrode mixture in a dispersion medium, onto a surface of the positive electrode current collector, followed by drying. The applied film after drying may be rolled as needed. The positive electrode mixture contains a positive electrode active material and a carbon nanotube, as essential components, and may contain a binder, a thickener, and the like, as optional components.

(Positive Electrode Active Material)

The positive electrode active material contains a composite oxide HN. The composite oxide HN is a lithium-transition metal composite oxide containing Ni, and the proportion of Ni in the metal elements other than Li in the composite oxide IN is 80 atm % or more. The composite oxide HN has, for example, a layered crystal structure (e.g., a rock-salt type crystal structure) and is capable of reversible intercalation and deintercalation of Li ions between the layers.

The higher the proportion of Ni is, the more the lithium ions can be extracted from the composite oxide HN during charge, and the capacity can be increased. However, Ni in the composite oxide HN whose capacity has been increased as above has a tendency to have a higher valence. Also, when the proportion of Ni is increased, the proportions of other elements are relatively decreased. In this case, the crystal structure tends to become unstable especially in a fully charged state and change to a crystal structure into and from which lithium ions are difficult to be reversibly absorbed and released during repeated charge and discharge. In the non-aqueous electrolyte secondary battery according to the present disclosure, despite the use of a composite oxide HN with such a high Ni content, by using a non-aqueous electrolyte containing a fluorosulfonic acid component, excellent cycle characteristics can be ensured.

The proportion of Ni in the metal elements other than Li is desirably 80 atm % or more, more desirably 90 atm % or more, and may be 92 atm % or more. The proportion of Ni in the metal elements other than Li is desirably, for example, 95 atm % or more. When defining a range, these upper and lower limits can be combined in any combination.

The composite oxide HN may contain at least one of Co and Mn. In view of the reduction in manufacturing costs, the Co content is desirably as small as possible. The composite oxide HN may contain Al, Co, Mn, and Al contribute to stabilize the crystal structure of the composite oxide HN with a high Ni content.

The proportion of Co in the metal elements other than Li is desirably 10 atm % or less, more desirably 5 atm % or less, and may contain no Co. In view of the stabilization of the crystal structure of the composite oxide HN, it is desirable to contain 1 atm % or more or 1.5 atm % or more of Co.

The proportion of Mn in the metal elements other than Li may be 10 atm % or less, and may be 5 atm % or less. The proportion of Mn in the metal elements other than Li may be 1 atm % or more, may be 3 atm % or more, and may be 5 atm % or more. When defining a range, these upper and lower limits can be combined in any combination.

The proportion of Al in the metal elements other than Li may be 10 atm % or less, and may be 5 atm % or less. The proportion of Al in the metal elements other than Li may be 1 atm % or more, may be 3 atm % or more, and may be 5 atm % or more. When defining a range, these upper and lower limits can be combined in any combination.

The composite oxide HN is, for example, represented by a formula: $Li_{\alpha}Ni_{(1-x1-x2-y-z)}Co_{x1}Mn_{x2}Al_{y}M_{z}O_{2+\beta}$. The element M is an element other than Li, Ni, Mn, Al, Co, and oxygen.

In the above formula, the α representing the atomic ratio of lithium is, for example, $0.95 \leq \alpha \leq 1.05$. The α increases and decreases during charge and discharge. In the (2+β) representing the atomic ratio of oxygen, β satisfies $-0.05 \leq \beta \leq 0.05$.

The 1-x1-x2-y-z (=v) representing the atomic ratio of Ni is 0.8 or more, may be 0.9 or more, may be 0.92 or more, and may be 0.95 or more. The v representing the atomic ratio of Ni may be 0.98 or less, and may be 0.95 or less. When defining a range, these upper and lower limits can be combined in any combination.

The x1 representing the atomic ratio of Co is, for example, 0.1 or less ($0 \leq x1 \leq 0.1$), may be 0.08 or less, may be 0.05 or less, and may be 0.01 or less. When x1 is 0, this encompasses a cases where Co is below the detection limit.

The x2 representing the atomic ratio of Mn is, for example, 0.1 or less ($0 \leq x2 \leq 0.1$), may be 0.08 or less, may be 0.05 or less, and may be 0.03 or less. The x2 may be 0.01 or more, and may be 0.03 or more. Mn contributes to stabilize the crystal structure of the composite oxide HN, and containing Mn, which is inexpensive, in the composite oxide HN is advantageous for cost reduction. When defining a range, these upper and lower limits can be combined in any combination.

The y representing the atomic ratio of Al is, for example, 0.1 or less ($0 \leq y \leq 0.1$), may be 0.08 or less, may be 0.05 or less, and may be 0.03 or less. The y may be 0.01 or more, and may be 0.03 or more. Al contributes to stabilize the crystal structure of the composite oxide HN. When defining a range, these upper and lower limits can be combined in any combination.

The z representing the atomic ratio of the element M is, for example, $0 \leq z \leq 0.10$, may be $0 < z \leq 0.05$, may be $0.001 \leq z \leq 0.01$. When defining a range, these upper and lower limits can be combined in any combination.

The element M may be at least one selected from the group consisting of Ti, Zr, Nb, Mo, W, Fe, Zn, B, Si, Mg, Ca, Sr, Se, and Y. In particular, when at least one selected from the group consisting of Nb, Sr, and Ca is contained in the composite oxide HN, the surface structure of the composite oxide HN can be stabilized, the resistance can be reduced, and the leaching of metals can be further suppressed. It is more effective when the element M is localized near the particle surfaces of the composite oxide HN.

The contents of the elements constituting the composite oxide HN can be measured using an inductively coupled plasma atomic emission spectroscopy (ICP-AES), an electron probe microanalyzer (EPMA), an energy dispersive X-ray spectroscopy (EDX), or the like.

The composite oxide HN is, for example, secondary particles formed of an aggregate of primary particles. The particle diameter of the primary particles is typically 0.05 μm or more and 1 μm or less. The average particle diameter of the secondary particles of the composite oxide HN is, for example, 3 μm or more and 30 μm or less, and may be 5 μm or more and 25 μm or less.

In the present specification, the average particle diameter of the secondary particles means a particle diameter at 50% cumulative volume (volume average particle diameter) in a particle diameter distribution measured by a laser diffraction and scattering method. Such a particle diameter is sometimes referred to as D50. As the measuring apparatus, for example, "LA-750", available from Horiba, Ltd. (HORIBA) can be used.

The composite oxide HN can be obtained, for example, by the following procedures. First, to a solution of a salt containing metal elements constituting the composite oxide HN, under stirring, a solution containing an alkali, such as sodium hydroxide, is added dropwise, to adjust the pH to the alkali side (e.g., 8.5 to 12.5), thereby to allow a composite hydroxide containing metal elements (metal elements selected from Ni, Mn, Al, Co, and an element M) to precipitate. Subsequently, the composite hydroxide is baked, to obtain a composite oxide (hereinafter sometimes referred to as a "raw material composite oxide") containing the metal elements. The baking temperature is not particularly limited, but is, for example, 300° C. to 600° C.

Next, by mixing the raw material composite oxide with a lithium compound, and baking the mixture under an oxygen gas flow, a composite oxide HN can be obtained. The baking temperature is not particularly limited, but is, for example, 450° C. or higher and 800° C. or lower. Each baking may be performed in a single stage, or in multiple stages, or while raising the temperature. In mixing the raw material composite oxide and the lithium compound, by mixing a compound containing the element M, the element M can be localized near the particle surfaces of the composite oxide HN.

As the lithium compound, lithium oxide, lithium hydroxide, lithium carbonate, a lithium halide, a lithium hydride, and the like may be used.

The positive electrode active material can contain a lithium-transition metal composite oxide other than the composite oxide HN, but preferably, the proportion of the composite oxide HN is high. The proportion of the composite oxide HN in the positive electrode active material is, for example, 90 mass % or more, may be 95 mass % or more, and may be 100%.

(Carbon Nanotubes)

The positive electrode or positive electrode mixture contains carbon nanotubes (CNTs). CNTs have a structure in which a sheet of a six-membered ring network formed of carbon atoms (graphene) is wound in a tubular shape. The outer diameter of CNTs is nano-sized, and the aspect ratio (the ratio of the fiber length to the outer diameter) of CNTs is extremely large. When the number of tubular graphene layers is one, the nanotubes are called single-walled CNTs (SWCNTs: single-walled carbon nanotubes). When the number of the above layers is more than one, the nanotubes are called multi-walled CNTs (MWCNTs: multi-walled carbon nanotubes).

CNTs have excellent electrical conductivity. CNTs form conductive paths between the particles of the positive electrode active material, to enhance the conductivity of the positive electrode mixture layer. Since conductive paths are formed between the particles of the positive electrode active material by CNTs having excellent electrical conductivity, the variations in the potential between the particles of positive electrode active material are reduced, and the non-uniformity of the charge-discharge reaction is suppressed.

As a result, the input-output characteristics in the electrode reaction are improved, and the cycle characteristics at high rates are remarkably improved.

The volume occupied by CNTs having a large aspect ratio in the positive electrode mixture layer is very small. Therefore, even when CNTs are present between the particles of the positive electrode active material, the permeability of the liquid electrolyte is little reduced. Furthermore, CNTs are fibrous. Therefore, even when the positive electrode active material is densely packed in the positive electrode mixture layer, the gaps for the non-aqueous electrolyte are likely to be ensured.

On the other hand, CNTs have a side of increasing the impedance of the positive electrode. To address this, in the non-aqueous electrolyte secondary battery of the present disclosure, a non-aqueous electrolyte containing a fluorosulfonic acid salt is used, which can suppress such a property of CNTs. This makes apparent only the benefit of a remarkable improvement in cycle characteristics at high rates.

The content of the CNTs in the positive electrode or the positive electrode mixture may be, for example, 0.01 parts by mass or more, may be 0.1 parts by mass or more, and may be 0.3 parts by mass or more, per 100 parts by mass of the positive electrode active material. The content of the CNTs may be 3 parts by mass or less, may be 1 part by mass or less, and may be 0.5 parts by mass or less, per 100 parts by mass of the positive electrode active material. When defining a range, these upper and lower limits can be combined in any combination.

The content of the CNTs in the positive electrode can be determined from a mixture sample obtained by washing a positive electrode obtained by disassembling a secondary battery in a discharged state, with an organic solvent, and after vacuum drying, peeling off the positive electrode mixture layer only, from the positive electrode. By performing a thermal analysis, such as TG-DTA, on the mixture sample, the proportions of the components other than the positive electrode active material can be calculated. The components other than the positive electrode active material include CNTs, a binder, a thickener, and others. The proportion of the CNTs in these components can be calculated by, for example, a microscopic Raman spectroscopy performed on a cross section of the positive electrode mixture layer.

The outer diameter of the CNTs is nano-sized. The fiber length of the CNTs can be, for example, 0.1 μm or more, and may be 1.0 μm or more, in light of the typical diameter of the secondary particles of the positive electrode active material. The fiber length of the CNTs may be 20 μm or less, and may be 5.0 μm or less.

The outer diameter and the fiber length of the CNTs can be determined by image analysis using a scanning electron microscope (SEM). For example, a plurality of (e.g., approx. 100 to 1000) CNTs are randomly selected, to measure the outer diameters and the fiber lengths thereof, and averaging each of them. The fiber length of the CNTs refers to the length measured when extended straight. The outer diameter refers to the dimension of the CNT in the direction orthogonal to the length direction thereof, and can be measured at any point of the CNT (e.g., near the center in the length direction).

The outer diameter of the CNTs may be, for example, 5 nm or less. The CNTs with an outer diameter of 5 nm or less include many single-walled CNTs. When the outer diameter of the CNTs determined from approximately 100 to 1000 CNTs by the aforementioned method is 5 nm or less, more than 50% of the CNTs are single-walled CNTs in many cases. That is, the ratio of the number of the single-walled CNTs to the total number of the CNTs is 50% or more.

The outer diameter of the CNTs may be larger than 5 nm. The CNTs with an outer diameter larger than 5 nm contain many multi-walled CNTs. Wen the outer diameter of the CNTs determined from approximately 100 to 1000 CNTs by the aforementioned method is larger than 5 nm, more than 50% of the CNTs are multi-walled CNTs in many cases. That is, the ratio of the number of the multi-walled CNTs to the total number of the CNTs is 50% or more.

Among various CNTs, multi-walled CNTs are preferred in view of improving the charge-discharge characteristics at high rates. The multi-walled CNTs may occupy 80% or more of the whole CNTs. When the multi-walled CNTs occupy 80% or more of the whole CNTs, the CNT content in the positive electrode or positive electrode mixture may be, for example, 0.1 parts by mass or more and 0.6 parts by mass or less, and may be 0.15 parts by mass or more and 0.5 parts by mass or less, per 100 parts by mass of the positive electrode active material.

The proportion of the multi-walled CNTs in the CNTs can be determined by the following method. With a scanning electron microscope (SEM), an image of a cross section of the positive electrode mixture layer or an image of the CNTs is obtained. Using the SEM image, a plurality (e.g., approx. 50 to 200) CNTs are selected at random and observed, to determine the number of multi-walled CNTs, and calculate a ratio of the number of multi-walled CNTs to the total number of the CNTs selected. Alternatively, a Raman spectroscopy can be used, to determine the proportion of the multi-walled CNTs in the CNTs.

(Others)

As the binder, for example, a resin material is used. Examples of the binder include fluorocarbon resins, polyolefin resins, polyamide resins, polyimide resins, acrylic resins, vinyl resins, and rubbery materials (e.g., styrene-butadiene copolymer (SBR)). The binder may be used singly or in combination of two or more kinds.

As the thickener, for example, cellulose derivatives, such as cellulose ethers, are exemplified. Examples of the cellulose derivatives include carboxymethyl cellulose (CMC) and modified products thereof, and methyl cellulose. The thickener may be used singly or in combination of two or more kinds.

As the conductive material, a conductive material other than CNTs may be used in combination. Examples of the conductive material other than CNTs include carbon fibers other than CNTs, and conductive particles (e.g., carbon black, graphite).

As the dispersion medium used in the positive electrode slurry, although not particularly limited, for example, water, an alcohol, N-methyl-2-pyrrolidone (NMP), and mixed solvents thereof can be used.

As the positive electrode current collector, for example, a metal foil can be used. The positive electrode current collector may be porous. Examples of the porous current collector include a net, a punched sheet, and an expanded metal. The material of the positive electrode current collector may be, for example, stainless steel, aluminum, an aluminum alloy, and titanium. The thickness of the positive electrode current collector is not particularly limited, but is, for example, 1 to 50 μm, and may be 5 to 30 μm.

[Negative Electrode]

The negative electrode includes a negative electrode active material. The negative electrode usually includes a negative electrode current collector, and a layer of a negative electrode mixture (hereinafter, a negative electrode mixture layer) held on the negative electrode current collector. The negative electrode mixture layer can be formed by applying a negative electrode slurry prepared by dispersing constituent components of the negative electrode mixture in a dispersion medium, onto a surface of the negative electrode current collector, followed by drying. The applied film after drying may be rolled as needed.

The negative electrode mixture contains a negative electrode active material as an essential component, and may contain a binder, a thickener, a conductive agent, and the like as optional components.

(Negative Electrode Active Material)

As the negative electrode active material, metal lithium, a lithium alloy, and the like may be used, but a material capable of electrochemically absorbing and releasing lithium ions is preferably used. Such a material includes a carbonaceous material and a Si-containing material. The negative electrode may contain these negative electrode active materials singly, or in combination of two or more kinds.

Examples of the carbonaceous material include graphite, graphitizable carbon (soft carbon), and non-graphitizable carbon (hard carbon). The carbonaceous material may be used singly, or in combination of two or more kinds. In particular, as the carbonaceous material, graphite is preferred because of its excellent stability during charge and discharge and its low irreversible capacity. Examples of the graphite include natural graphite, artificial graphite, and graphitized mesophase carbon particles.

Examples of the Si-containing material include elementary Si, a silicon alloy, and a silicon compound (e.g., silicon oxide), and a composite material including a lithium-ion conductive phase (matrix) and a silicon phase dispersed therein. The silicon oxide is exemplified by $SiO_x$ particles. The x may be, for example, $0.5 \leq x < 2$, and may be $0.8 \leq x \leq 1.6$. The lithium-ion conductive phase can be at least one selected from the group consisting of a $SiO_2$ phase, a silicate phase, and a carbon phase.

As the binder, the thickener, and the conductive agent, and the dispersion medium used in the negative electrode slurry, for example, the materials exemplified for the positive electrode can be used.

As the negative electrode current collector, for example, a metal foil can be used. The negative electrode current collector may be porous. The material of the negative electrode current collector may be, for example, stainless steel, nickel, a nickel alloy, copper, and a copper alloy. The thickness of the negative electrode current collector is not particularly limited, but is, for example, 1 to 50 μm, and may be 5 to 30 μm.

[Non-Aqueous Electrolyte]

The non-aqueous electrolyte contains a non-aqueous solvent and a lithium salt.

(Fluorosulfonic Acid Salt)

The non-aqueous electrolyte contains a fluorosulfonic acid salt represented by a formula (1):

[Chem. 1]

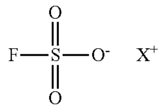

In the formula (1), X is a cation.

The fluorosulfonic acid salt may be at least one selected from the group consisting of $FSO_3Li$ (lithium fluorosulfonate) and $FSO_3Na$ (sodium fluorosulfonate). In particular, $FSO_3Li$ (lithium fluorosulfonate), which is a lithium salt, is preferred. The fluorosulfonic acid salt can produce a fluorosulfonate anion in the non-aqueous electrolyte. Therefore, the fluorosulfonate anion is counted as the fluorosulfonic acid salt.

The content of the fluorosulfonic acid salt in the non-aqueous electrolyte may be 5 mass % or less, may be 3 mass % or less, may be 1.5 mass % or less, may be 1 mass % or less, and may be 0.5 mass % or less. When the content of the fluorosulfonic acid salt is in such a range, excessive surface film formation on the surface of the positive electrode is suppressed, and the effect of suppressing the increase in internal resistance when charge and discharge are repeated can be enhanced. In the non-aqueous electrolyte secondary battery, the content of the fluorosulfonic acid salt in the non-aqueous electrolyte changes during storage or during charge and discharge. It suffices therefore that the fluorosulfonic acid salt remains at a concentration equal to or above the detection limit, in the non-aqueous electrolyte collected from the non-aqueous electrolyte secondary battery. The content of the fluorosulfonic acid salt in the non-aqueous electrolyte may be 0.01 mass % or more.

The content of the fluorosulfonic acid salt in the non-aqueous electrolyte used for manufacturing a non-aqueous electrolyte secondary battery may be 0.01 mass % or more, and may be 0.1 mass % or more, or 0.3 mass % or more. The content of the fluorosulfonic acid salt in the non-aqueous electrolyte used for manufacturing a non-aqueous electrolyte secondary battery is, for example, 5 mass % or less, may be 3 mass % or less, may be 1.5 mass % or less, and may be 1 mass % or less, or 0.5 mass % or less. These lower and upper limits can be combined in any combination.

The content of the fluorosulfonic acid salt in the non-aqueous electrolyte can be determined, for example, using gas chromatography under the following conditions.

Instrument used: GC-2010 Plus, available from Shimadzu Corporation

Column: HP-1 (membrane thickness: 1 μm, inner diameter: 0.32 mm, length: 60 m), available from J&W Corporation Column temperature: raised from 50° C. to 90° C. at a temperature rise rate of 5° C./min and held at 90° C. for 15 minutes, and then, raised from 90° C. to 250° C. at a temperature rise rate of 10° C./min and held at 250° C. for 15 minutes Split ratio: 1/50

Linear velocity: 30.0 cm/sec

Inlet temperature: 270° C.

Injection amount: 1 μL

Detector: FID 290° C. (sens. $10^1$)

(Non-Aqueous Solvent)

Examples of the non-aqueous solvent include cyclic carbonic acid esters, chain carbonic acid esters, cyclic carboxylic acid esters, and chain carboxylic acid esters. The cyclic carbonic acid esters are exemplified by propylene carbonate (PC) and ethylene carbonate (EC). The chain carbonic acid esters are exemplified by diethyl carbonate (DEC), ethyl methyl carbonate (EMC), and dimethyl carbonate (DMC). The cyclic carboxylic acid esters are exemplified by γ-butyrolactone (GBL), and γ-valerolactone (GVL). The chain carboxylic acid esters are exemplified by methyl formate, ethyl formate, propyl formate, methyl acetate (MA), ethyl acetate, propyl acetate, methyl propionate, ethyl propionate, and propyl propionate. The non-aqueous electrolyte may contain these non-aqueous solvents singly, or in combination of two or more kinds.

(Lithium Salts)

Examples of the lithium salt include: $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, borates, and imides. Examples of the borates include lithium difluorooxalate borate, and lithium bisoxalate borate. Examples of the imides include lithium bisfluorosulfonyl imide ($LiN(FSO_2)_2$), and lithium bis(trifluoromethanesulfonyl)imide ($LiN(CF_3SO_2)_2$). The non-aqueous electrolyte may contain these lithium salts singly, or in combination of two or more kinds.

The concentration of the lithium salt (when the fluorosulfonic acid salt is lithium fluorosulfonate, the lithium salt other than lithium fluorosulfonate) in the non-aqueous electrolyte is, for example, 0.5 mol/L or more and 2 mol/L or less.

The non-aqueous electrolyte may contain another additive. The other additive is, for example, at least one selected from the group consisting of vinylene carbonate, fluoroethylene carbonate, and vinylethylene carbonate. In particular, fluoroethylene carbonate (FEC) is less likely to cause side reactions at the positive electrode, and is desirable from the point of further suppressing the deterioration of the positive electrode. Some non-aqueous solvents, such as ethylene carbonate (EC), are a component that forms a solid electrolyte interface (SEI) on the negative electrode, and are considered to play an important role in reducing the internal resistance of the battery. On the other hand, these some non-aqueous solvents have slightly low oxidation resistance to the positive electrode at a high potential, and are gradually oxidized and decomposed when charge-discharge cycles in which the positive electrode is charged to a high potential are repeated, forming a high-resistance surface film on the positive electrode. On the other hand, FEC is excellent in oxidation resistance and is expected to form a low-resistance SEI on the negative electrode. By including FEC in the non-aqueous solvent at a predetermined ratio, oxidative decomposition of the components of the liquid electrolyte can be remarkably suppressed even when the positive electrode is charged to a high potential.

The proportion by volume of the FEC in the whole solvent is, for example, preferably 5 vol % or more and 30 vol % or less, more preferably 10 vol % or more and 25 vol % or less, further more preferably 15 vol % or more and 25 vol % or less. As a solvent used in combination with FEC, a chain carbonic acid ester is preferred because the viscosity of the liquid non-aqueous electrolyte can be easily adjusted. The total volume of the FEC and the chain carbonic acid ester in the whole solvent preferably occupies 80 vol % or more, and may occupy 100%.

[Separator]

It is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. As the material of the separator, a polyolefin, such as polypropylene and polyethylene, is preferred.

In an exemplary structure of the non-aqueous electrolyte secondary battery, an electrode group formed by winding the positive electrode and the negative electrode with the separator interposed therebetween is housed together with the non-aqueous electrolyte in an outer body. However, without limited thereto, an electrode group in a different form may be adopted. For example, the electrode group may be of a stacked type formed by stacking the positive electrode and the negative electrode with the separator interposed therebetween. The type of the non-aqueous electrolyte secondary battery is also not particularly limited, and may of a cylindrical, prismatic, coin, button, or laminate type.

In the following, the structure of a prismatic non-aqueous electrolyte secondary battery as an example of the non-aqueous electrolyte secondary battery according to the present invention will be described with reference to FIG. 1.

The battery includes a bottomed prismatic battery case 4, and an electrode group 1 and a non-aqueous electrolyte (not shown) housed in the battery case 4. The electrode group 1 has a long negative electrode, a long positive electrode, and a separator interposed between the positive electrode and the negative electrode. A negative electrode current collector of the negative electrode is electrically connected, via a negative electrode lead 3, to a negative electrode terminal 6 provided on a sealing plate 5. The negative electrode terminal 6 is electrically insulated from the sealing plate 5 by a gasket 7 made of resin. A positive electrode current collector of the positive electrode is electrically connected, via a positive electrode lead 2, to the back side of the sealing plate 5. That is, the positive electrode is electrically connected to the battery case 4 serving as a positive electrode terminal. The periphery of the sealing plate 5 is engaged with the opening end of the battery case 4, and the engaging portion is laser-welded. The sealing plate 5 is provided with an injection port for non-aqueous electrolyte, which is closed with a sealing plug 8 after electrolyte injection.

The present invention will be more specifically described below with reference to Examples and Comparative Examples, but the present invention is not limited to the following Examples.

EXAMPLES

Examples 1 and 2 and Comparative Examples 1 to 5

A non-aqueous electrolyte secondary battery was fabricated and evaluated in the following procedure.

(1) Production of Positive Electrode

To 95 parts by mass of positive electrode active material particles, 2.5 parts by mass of acetylene black, 2.5 parts by mass of polyvinylidene fluoride, and an appropriate amount of NMP were added, and mixed, to obtain a positive electrode slurry. Next, the positive electrode slurry was applied onto a surface of the aluminum foil, and the applied film was dried, and then rolled, to form a positive electrode mixture layer on both sides of the aluminum foil. A positive electrode was thus obtained.

As the positive electrode active material, a composite oxide HN having a composition as shown in Table 1 was used.

The outer diameter of CNTs was set to 8.0 nm, and the fiber length thereof was set to 4 μm.

(2) Production of Negative Electrode

A silicon composite material and graphite were mixed at a mass ratio of 5:95 and used as a negative electrode active material. Then, 97.8 parts by mass of the negative electrode active material, 1.2 parts by mass of a sodium salt of CMC (CMC-Na), 1 part by mass of SBR, and an appropriate amount of water were mixed, to prepare a negative electrode slurry. Next, the negative electrode slurry was applied onto a surface of a copper foil, and the applied film was dried, and then rolled, to form a negative electrode mixture layer on both sides of the copper foil.

(3) Preparation of Non-Aqueous Electrolyte

Ethylene carbonate (EC), fluoroethylene carbonate (FEC), ethyl methyl carbonate (EMC), and dimethyl carbonate (DMC) were used to prepare a non-aqueous solvent having a composition (vol %) as shown in Table 1, in which $LiPF_6$ and, if necessary, a fluorosulfonic acid salt as shown in Table 1 were dissolved, to prepare a non-aqueous electrolyte (liquid electrolyte). The concentration of the $LiPF_6$ in the non-aqueous electrolyte was set to 1.35 mol/L. The concentration (initial concentration) of the fluorosulfonic acid salt in the prepared non-aqueous electrolyte was set to the values (mass %) shown in Table 1.

(4) Preparation of Non-Aqueous Electrolyte Secondary Battery

To the positive electrode obtained above, a positive electrode lead made of Al was attached, and to the negative electrode, a negative electrode lead made of Ni was attached. In an inert gas atmosphere, the positive electrode and the negative electrode were spirally wound with a polyethylene thin film (separator) interposed therebetween, to prepare a wound electrode group. The electrode group was housed in a bag-shaped outer body formed of a laminate sheet having an Al layer, and after injection of the non-aqueous electrolyte thereinto, the outer body was sealed, to complete a non-aqueous electrolyte secondary battery. In housing the electrode group in the outer body, part of the positive electrode lead and part of the negative electrode lead were each exposed externally from the outer body.

(5) Evaluation

The non-aqueous electrolyte secondary batteries obtained in Examples and Comparative Examples were each subjected to the following evaluations.

(a) Measurement of Initial Impedance

After charged to 3.75 V, the battery was left to stand in a 25° C. environment for 1 hour, and then, measured for its AC impedance. The impedance measurement results are shown in a Nyquist diagram, with the real component of the impedance plotted on the X-axis, and the imaginary component plotted on the Y-axis. In the Nyquist diagram, the charge transfer at the positive electrode/non-aqueous electrolyte interface and the charge transfer at the negative electrode/non-aqueous electrolyte interface each appear as a semicircular arc component, and the diameter of the semicircular are represents the resistance value of the charge transfer resistance.

(b) Charge-Discharge Cycle Test

In a 25° C. temperature environment, the battery was constant-current charged at a constant current of 0.5 It until the voltage reached 4.1 V, and then, constant-voltage charged at a constant voltage of 4.1 V until the current reached 0.02 It. Subsequently, the battery was constant-current discharged at a constant current of 0.5 It until the voltage reached 3.0 V. With this charging and discharging was taken as one cycle, 100 cycles were performed in total.

(c) Impedance Increase Rate (ΔI)

Except for using the battery having subjected to 100 cycles of the above charging and discharging of the above (b), in the same manner as in the above (a), an impedance (I) (I at 100th cycle) was calculated. The ratio of the I value after 100 cycles to the initial I value was calculated as an impedance increase rate (ΔI), using the following equation. The results are shown in Table 1 as a relative value, with the ΔI numerical value of a battery C1 taken as 100%.

$$\Delta I\ (\%)=\{(I \text{ value at } 100th \text{ cycle}-\text{initial } I \text{ value})\}/\text{initial } I \text{ value}\times 100$$

(d) High-Rate Capacity Retention Rate (HMR)

In a 25° C. temperature environment, the battery was constant-current charged at a constant current of 0.70 It until the voltage reached 4.1 V, and then, constant-voltage charged at a constant voltage of 4.1 V until the current reached 0.02 It. Subsequently, the battery was constant-current discharged at a constant current of 1.00 It until the voltage reached 3.0 V. With this charging and discharging at high rates was taken as one cycle, 100 cycles were performed in total.

In the charge-discharge cycle test of the above (d), the discharge capacity at the 1st cycle and the discharge capacity at the 100th cycle were measured, and the capacity retention rate (HMR) was obtained from the following equation, and taken as an index of cycle characteristics. The results are shown in Table 1 as a relative value, with the HMR numerical value of the battery C1 taken as 100%.

$$\text{HMR } (\%)=(\text{Discharge capacity at } 100th \text{ cycle}/\text{Discharge capacity at } 1st \text{ cycle})\times 100$$

In Table 1, E1 and E2 correspond to Examples 1 and 2, and C1 to C5 correspond to Comparative Examples 1 to 5.

TABLE 1

| | $LiNi_vCo_{x1}Mn_{x2}Al_yO_2$ v = 1-x1-x2-y | | | | CNTs mass | $FSO_3Li$ mass | Non-aqueous solvent | ΔI | HMR |
|---|---|---|---|---|---|---|---|---|---|
| Battery | v | x1 | x2 | Y | % | % | vol % | (%) | (%) |
| E1 | 0.85 | 0.08 | 0.01 | 0.06 | 0.4 | 1 | EC/EMC/DMC = 20/5/75 | 96 | 106 |
| E2 | 0.85 | 0.08 | 0.01 | 0.06 | 0.4 | 1 | FEC/EMC/DMC = 20/5/75 | 95 | 108 |
| C1 | 0.85 | 0.08 | 0.01 | 0.06 | — | 0 | EC/EMC/DMC = 20/5/75 | 100 | 100 |
| C2 | 0.85 | 0.08 | 0.01 | 0.06 | 0.4 | 0 | EC/EMC/DMC = 20/5/75 | 120 | 103 |
| C3 | 0.85 | 0.08 | 0.01 | 0.06 | — | 1 | EC/EMC/DMC = 20/5/75 | 96 | 97 |
| C4 | 0.85 | 0.08 | 0.01 | 0.06 | — | 0 | FEC/EMC/DMC = 20/5/75 | 99 | 101 |
| C5 | 0.85 | 0.08 | 0.01 | 0.06 | — | 1 | FEC/EMC/DMC = 20/5/75 | 94 | 98 |

First, a comparison of C1 with C2 shows that when CNTs were used in the positive electrode (C2), as compared to when CNTs were not used (C1), the HMR was improved by 3%, but the impedance increase rate was increased by as much as 20%.

Next, a comparison of C1 with C3 shows that when a fluorosulfonic acid salt was used in the non-aqueous electrolyte (C3), as compared to when no fluorosulfonic acid salt was used, the impedance increase rate was reduced by 4%, but due to the increased viscosity of the non-aqueous electrolyte, the HMR was deteriorated by 3.0%.

On the other hand, a comparison of C1 with E1 shows when CNTs were used in the positive electrode, and a fluorosulfonic acid component was used in the non-aqueous electrolyte (E1), the impedance increase rate was reduced by 4%, and furthermore, the HMR was improved as much as 6.0%.

In other words, the results show that although the fluorosulfonic acid salt acts to increase the viscosity of the non-aqueous electrolyte, when used in combination with CNTs, the effect of improving the cycle characteristics at high rates produced by the CNTs can be further enhanced, and the demerit associated with the use of CNTs can be eliminated.

Furthermore, the results show that by using FEC in place of the EC, the breadth of improvement in the impedance increase rate and the HMR can be further increased.

INDUSTRIAL APPLICABILITY

The non-aqueous electrolyte secondary battery of the present disclosure is suitably applicable as a main power source for mobile communication devices, portable electronic devices, a power source for in-vehicle use, and the like. The application is, however, not limited to these.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: electrode group, 2: positive electrode lead, 3: negative electrode lead, 4: battery case. 5: sealing plate, 6: negative electrode terminal. 7: gasket, 8: sealing plug

The invention claimed is:

1. A non-aqueous liquid electrolyte secondary battery, comprising:

a positive electrode; a negative electrode; and a non-aqueous electrolyte, wherein the positive electrode includes a positive electrode active material, and a carbon nanotube, the positive electrode active material includes a lithium-transition metal composite oxide containing Ni, a proportion of Ni in metal elements other than Li in the lithium-transition metal composite oxide is 80 atm % or more, and the non-aqueous electrolyte includes a fluorosulfonic acid salt.

2. The non-aqueous liquid electrolyte secondary battery according to claim 1, wherein the lithium-transition metal composite oxide is represented by a formula: $Li_{\alpha}Ni_{(1-x1-x2-y-z)}Co_{x1}Mn_{x2}Al_{y}M_{z}O_{2+\beta}$, where $0.95 \leq \alpha \leq 1.05$, $0.8 \leq 1-x1-x2-y-z < 1.0$, $0 \leq x1 \leq 0.1$, $0 \leq x2 \leq 0.1$, $0 \leq y \leq 0.1$, $0 \leq z \leq 0.1$, and $-0.05 \leq \beta \leq 0.05$, and M is an element other than Li, Ni, Mn, Al, Co, and oxygen.

3. The non-aqueous liquid electrolyte secondary battery according to claim 1, wherein the fluorosulfonic acid salt is at least one selected from the group consisting of $FSO_3Li$ and $FSO_3Na$.

4. The non-aqueous liquid electrolyte secondary battery according to claim 1, wherein a content of the fluorosulfonic acid salt in the non-aqueous electrolyte is 5 mass % or less.

5. The non-aqueous electrolyte secondary battery according to claim 1, wherein the non-aqueous electrolyte includes fluoroethylene carbonate.

6. The non-aqueous electrolyte secondary battery according to claim 1, wherein a content of the carbon nanotube included in the positive electrode is 0.01 parts by mass or more and 3 parts by mass or less, per 100 parts by mass of the positive electrode active material.

7. The non-aqueous electrolyte secondary battery according to claim 1, wherein the carbon nanotube includes 80% or more of a multi-walled carbon nanotube.

* * * * *